April 16, 1963 A. N. T. ST. JOHN ET AL 3,085,438
DIP PIPE ASSEMBLY
Filed Sept. 29, 1959 2 Sheets-Sheet 1
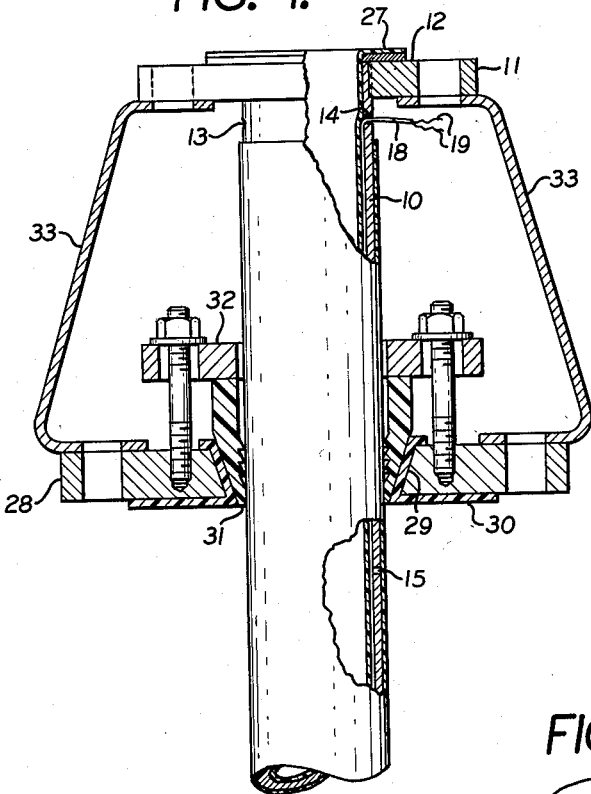
FIG. 1.
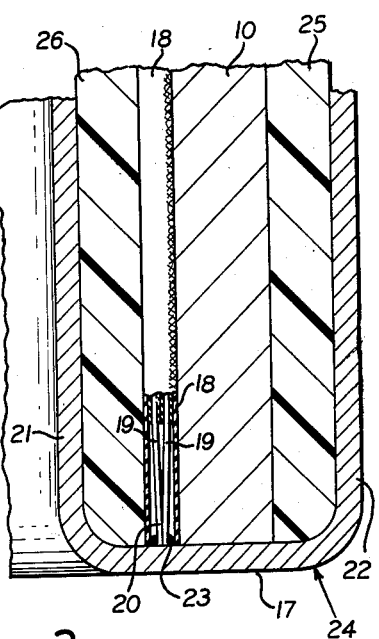
FIG. 2.
FIG. 3.
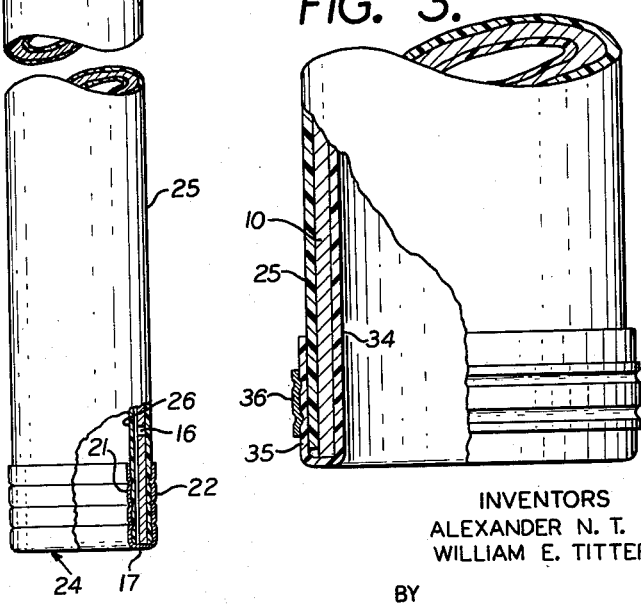
INVENTORS
ALEXANDER N. T. ST. JOHN
WILLIAM E. TITTERTON
BY
Byerly, Townsend, Watson & Churchill
ATTORNEYS.

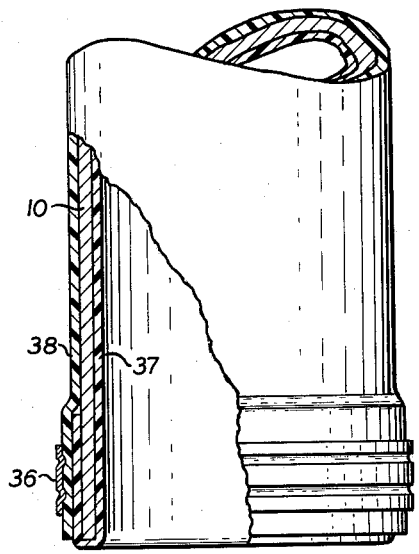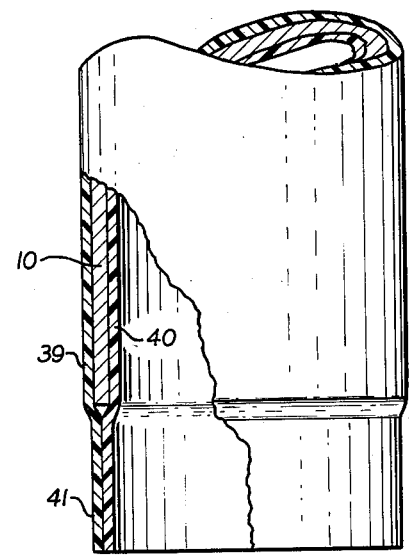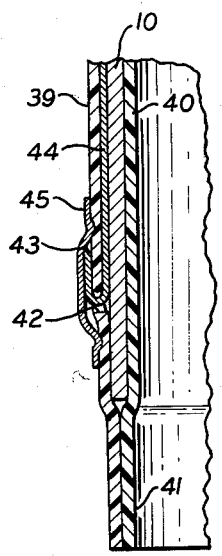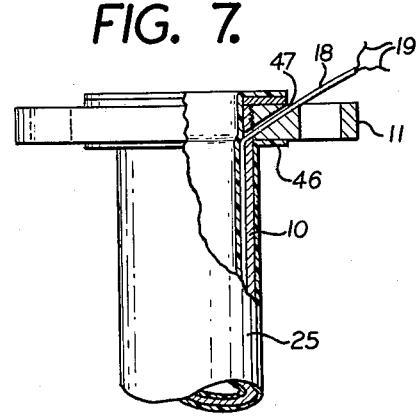

United States Patent Office 3,085,438
Patented Apr. 16, 1963

3,085,438
DIP PIPE ASSEMBLY
Alexander N. T. St. John, Glen Ridge, and William E. Titterton, Whippany, N.J., assignors to Resistoflex Corporation, Roseland, N.J., a corporation of New York
Filed Sept. 29, 1959, Ser. No. 843,146
12 Claims. (Cl. 73—421)

The present invention relates to a dip pipe assembly and more particularly to a chemically inert assembly for use where corrosion problems are a factor.

In various chemical reaction operations, for example, it is necessary to install in the reaction vessel one or more dip pipes, i.e., pipes or tubes which extend into the vessel and have external provision for coupling to a conduit, for the infusion ((addition) or extraction (removal) of materials therefrom. In addition, where it has been required to monitor the temperature of the reaction, there has also been inserted in the vessel, heretofore, various types of thermowells which consist generally of a tubular structure sealed at the bottom and into which can be placed the thermosensitive element. The thermowell, being sealed, protects the thermo-sensitive element from the reaction material.

When corrosive materials are involved in the reaction, it has heretofore been the practice to use metal structures clad with coatings of vitreous enamel or lined with porcelain or the like. These structures have the disadvantage of requiring gentle handling and are readily subject to damage.

Recently, with the advent of polytetrafluoroethylene resin (hereinafter abbreviated P.T.F.E.), it has become possible to produce pipe lined and/or jacketed with the resin which can be used in all but a few situations involving the handling of corrosive materials. A method for producing such pipe is described and claimed in the copending joint application of the present applicants, Serial No. 637,159, filed January 30, 1957 for "Prestressed Polytetrafluoroethylene Tubes and Method of Manufacture," and assigned to the same assignee as the present application.

The present invention involves a novel dip pipe assembly having the chemically inert properties of P.T.F.E. and combining in a single structure both the functions of the dip pipe and the thermowell. Thus, in one stroke the present invention materially reduces the number of ports required in a reaction or processing vessel, reduces the number of insert type structures, and eliminates the breakage factor inherent in vitreous or porcelain linings.

Therefore, in accordance wth one aspect of the present invention there is provided a dip pipe assembly which comprises an elongated rigid tubular core, a connecting flange secured to one end of the core, a lining of extruded sintered P.T.F.E. resin extending throughout the length of the core in intimate contact with the walls thereof and beyond the one end of the core radially outwardly over the gasket face of the flange, a jacket of extruded sintered P.T.F.E. resin surrounding the core in intimate contact therewith from a point adjacent the flange to the opposite end of the core, the jacket and lining providing a chemically inert cover for the core, a thermo-sensitive electrical element disposed between the core and the inert cover at a point remote from the flange, the cover having an interruption therein for exposing the element, thermally conductive chemically inert means joined in thermal transfer relationship to the thermo-sensitive element and sealing the interruption in the cover, a pair of electrical conductors connected to the thermo-sesitive element for making external electrical connection thereto, and means for mounting the assembly in the wall of a vessel with the thermo-sensitive element on the inside of the vessel. It should be clearly obvious to those skilled in the art that the connecting flange will be used to connect the dip pipe to an appropriate conduit.

In order to produce a satisfactory dip pipe in accordance with the present invention it was necessary to overcome a number of problems. One particular problem exists by reason of the permeability of the P.T.F.E. resin to certain gases and the possibility of entrapping gas or vapor between the core and the protective resin cover. Entrapped gas will expand in known fashion when the assembly is heated and can cause blisters and even ruptures in the jacket or lining if nothing is done to relieve the situation. Fortunately it has been discovered that the provision of a plurality of judiciously disposed apertures in the wall of the core can completely eliminate the possibility of failure from this cause.

Thus, where the means for mounting the assembly is of the type including a compression type gasket for securing a fluid-tight grip (collet-fashion) upon the assembly near the connecting flange but at a point overlying the jacket, there is additionally provided in accordance with a further aspect of the invention at least one aperture in the wall of the core located between the connecting flange and the near end of the jacket, which is for the purpose terminated a short distance from the flange, and at least one further aperture in the wall of the core so located as to be in the region between the mounting means and the opposite end of the core when the assembly is installed in a vessel.

In order to produce a serviceable assembly it is necessary to develop a satisfactory seal between the layers of P.T.F.E. resin. Therefore, a number of techniques had to be developed for joining together the jacket and lining at the in-tank or internal end of the assembly. Each technique has certain advantages and disadvantages and circumstances will dictate which is preferable in a given situation.

In one arrangement according to the invention an annular cup-like member of a chemically inert material such as tantalum is provided, the member having an inner tubular wall expanded within the lining and an outer tubular wall contracted about the jacket to compress the lined and jacketed core therebetween.

In a further arrangement the lining is extended beyond the end of the core and turned outwardly and reentrantly to form a cuff either under or over the end of the jacket and a chemically inert ring element again, for example, of tantalum, is provided to clamp together the cuff and jacket.

In a still further arrangement a bond is established by a special process between extensions of the jacket and lining beyond the end of the core.

It is believed that the invention will be better understood after reading the following detailed description of several embodiments thereof with reference to the appended drawings in which:

FIG. 1 is an elevational view partly in section of a dip pipe assembly including a thermo-sensitive element as a component part thereof;

FIG. 2 is an enlarged fragmentary view showing the details of a thermo-sensitive element for use in the assembly of FIG. 1;

FIG. 3 is an enlarged fragmentary partial sectional view of a modified end seal for the assembly of FIG. 1;

FIG. 4 is a view similar to FIG. 3 showing a further modification thereof;

FIG. 5 is a view similar to FIG. 3 showing a still further modification thereof;

FIG. 6 is a view similar to FIG. 3 illustrating one way of combining a thermo-sensitive element with the modifications of FIGS. 3, 4 and 5, and FIG. 7 is a fragmentary view of the mounting end of a dip pipe assembly showing a further modification thereof.

Referring now to FIG. 1, an elongated rigid tubular core 10, preferably in the form of a seamless steel pipe, with a connecting flange 11 threaded and tack welded on one end is degreased, deburred and provided with a plurality of vent holes or apertures. The presently preferred practice is to locate two holes approximately 180° apart about 2" from the gasket face 12 of the flange 11. These are represented by the apertures 13 and 14.

The aperture 15 with another hole approximately diametrically opposite (not shown) is located about 11" from the face 12 of the flange. Finally, the aperture 16 with a diametrically opposite aperture (not shown) is located 2 to 3 inches from the bottom end 17 of the dip pipe assembly.

Next, the pipe or core 10 is machined at the end 17 for a distance of approximately 1½" to 2" along its length to eliminate any eccentricity between the inner and outer surfaces.

After the core is prepared, two tubes of sintered extruded P.T.F.E. are selected which have been prepared as described in the aforementioned application, one tube being selected for the lining and the other for the jacket. The jacket is slipped on the core and temporarily secured directly behind the flange 11 by means of a hose clamp or similar device. The lining tube is inserted and both the jacket and lining tubes are arranged to extend about 4 to 5 inches beyond the bottom end 17 of the core. An equal length of liner is arranged to extend beyond the face 12 of the flange 11. When the lining tube is inserted there is also inserted an insulating sleeve 18 containing a pair of electrical conductors 19 leading to a thermocouple 20 (best seen in FIG. 2) or other thermo-sensitive electrical element. The sleeve 18 with its contents is placed between the core 10 and the lining tube with the thermocouple 20 extending beyond the bottom end 17 of the core and the conductors 19 passing through the aperture 14.

As described more fully in the aforementioned application, a tube of sintered extruded P.T.F.E. can be heated to a temperature near to but below the gel point of the resin and can then be deformed radially to either enlarge or decrease its girth. If the tube is rapidly cooled while the deforming force is maintained it will retain its deformed condition substantially indefinitely. That is, it will retain its altered size until reheated to a temperature below the gel point but preferably approximately the forming temperature. Upon such reheating the tube will tend to return to its original size. By proper choice of original size relative to a tubular core it is possible to cause a jacket to shrink down upon and a lining to expand within the core and provide a strongly united assembly.

The assembly of core, P.T.F.E. tubes, and electrical components, as described above, is therefore heated and subsequently cooled to provide a tight jacket and lining. Next the extension of resin material beyond the bottom end 17 is trimmed flush with the end of the core.

A thermally conductive chemically inert element such as an annular cup-like member of tantalum having an inner tubular wall 21 and an outer tubular wall 22 of suitable dimensions is then soldered to the tip of the thermocouple 20 as seen at 23 in FIG. 2 to provide a good thermal connection therebetween. Although the lining tube of P.T.F.E. is now snugly gripping the wall of the core 10 in intimate contact therewith it will be found possible to withdraw the conductors 19 and insulating sleeve 18 through the aperture 14 as the cup-like element 24 is telescoped about the bottom of the dip pipe assembly. A serrating tool may now be applied under pressure to groove and expand the wall 21 and similarly groove and contract the wall 22 of the element 24 in order to compress the lining and jacket upon the core 10. The lower end of the assembly will now appear as shown in FIG. 1. If necessary, a longitudinal groove (not shown) can be provided in the core 10, particularly in the region of the element 24, to receive the sleeve 18 with its contents and provide a smooth surface for the clamping action of the cup-like element.

Following the above, the jacket 25 can be trimmed back from the flange 11 after removal of the clamping means until the apertures 13 and 14 are exposed as shown.

Either at this time or prior to the end sealing operations, whichever is most convenient, the lining 26 is flared radially outwardly over the gasket face of the flange 11 as shown at 27. The flaring operation can be accomplished by the application of heat and pressure. A typical flaring procedure is described in further detail in the copending application of Edward Chu, Serial No. 824,071, filed June 30, 1959 for "Corrosion Proof Pipe Fitting," and assigned to the same assignee as the present application.

For the purpose of mounting the dip pipe in a vessel wall it can now be provided with a nozzle flange 28 which has a tapered bore 29. The bore 29 is lined with P.T.F.E. as shown at 30. A compression type gasket or packing gland 31 of P.T.F.E. is arranged with a conical outer surface to mate with the bore 29 of the nozzle flange 28 and wedgingly (collet-fashion) secure the pipe assembly therein in a fluid-tight grip in a manner that should be readily apparent. A gland flange 32 is bolted to the nozzle flange for urging the gland 31 into operative position.

The nozzle flange 28 is located at a distance spaced from the flange 11 such as to overlie the jacket 25 but positioned between the aperture 15 and the end of the jacket.

A plurality of brace straps 33, preferably four in number, are arranged to tie the nozzle flange to the connecting flange 11. These straps have been found useful in resisting a rocking motion of the dip pipe in the plastic packing gland 31. The bolts (not shown) which are employed to secure the respective flanges may also secure the brace straps.

Having described the construction of a typical assembly in accordance with the invention it is now possible to discuss the functioning of the vent holes. Due to various causes such as the presence of organic materials on the steel core 10 or permeation of the P.T.F.E. protective cover it is possible for gas or vapor to be present between the core and the lining or jacket. If it is present between the lining 26 and the core 10 it can pass upwardly as viewed in FIG. 1, between the unbonded core and lining to the apertures 13 and 14 and then out to the atmosphere. These gases can not pass downwardly because of the compression seal developed by the crimping of the member 24. Any gases trapped on the outside of the core but within the jacket can escape through the open end of the jacket if originally above the packing gland 31 and mounting means. If below the packing gland, the constricting pressure applied to the jacket effectively seals off this exit. In the downward direction the gases are stopped by compression of the member 24. This leaves the apertures 15 and 16 and their opposite counterparts as the only means of egress. But, as previously explained, once the gases reach the inner surface of the core they are free to pass up and out the openings 13 and 14. In this manner the entire problem of entrapped gas and vapor is completely eliminated by proper location of the vent openings in the core.

From the foregoing it should be apparent that the thermo-sensitive element may be omitted and the same structure employed as a conventional dip pipe. Instead of the annular cup-like member 24 it is possible to seal the end of the assembly as shown in FIG. 3. In this figure the lining 34 is extended and turned outwardly and reentrantly to form the cuff 35 overlying the end of the jacket 25. A chemically inert ring element 36, e.g. tantalum, is swaged or crimped in place over the cuff to compress it against the jacket to form a seal therebetween.

The procedure for making the construction of FIG. 3 is to machine only the outside of the end of the core for concentricity, then relax the lining and jacket in place as with the previous embodiment. However, now only the jacket is trimmed flush with the end of the core, and by means of a hot flaring tool and sizing ring the liner is folded back over the jacket.

Alternatively the construction of FIG. 4 may be employed. Here the lining 37 is folded back over the core 10 but under the jacket 38 before application of the band or ring 36.

With the modification of FIG. 4, however, it is necessary to relax the lining first and produce the cuff at the end of the assembly before the jacket is applied and shrunk into position. Although requiring an additional heating cycle, the procedure is advantageous when it is desired to repair a damaged jacket.

All of the embodiments described thus far have in common the need for a swaged or crimped ring or cup-like member for establishing a seal at the end of the assembly. However, by the technique described below it is possible to bond together extensions of the jacket 39 and lining 40 as shown at 41 in FIG. 5.

Thus, the core 10 is lined and jacketed as described with reference to FIG. 1, allowing both layers of P.T.F.E. to extend several inches beyond the end of the core which has been initially prepared by radiusing the bottom edges. That is, the sharp corners are removed. The surfaces to be bonded are cleaned with carbon tetrachloride. A strip of unfused P.T.F.E. tape is disposed between the ends of the liner and jacket. A suitable clamp such as a split ring and plug is secured to the ends of the resin tubes. By any convenient method the temperature of the clamped portion is gradually raised to about 720° F. and maintained for about 30 to 60 minutes. It may be necessary to localize the heat and maintain areas adjacent the seal at a lower temperature. The assembly is then cooled, preferably by quenching, and the clamp is removed. Excess material can then be trimmed away. Care should be taken to avoid excess clamping pressure during the heating cycle.

The modifications of FIGS. 3, 4 and 5 have been described as applied to a conventional dip pipe without the inclusion of a thermo-sensitive element. It is to be understood, however, that the rest of the structure is intended to be the same as that shown in FIG. 1 including the provision of the vent holes or apertures in the core and with the jacket and lining of P.T.F.E. cooperating to provide a chemically inert protective cover therefor.

In FIG. 6, there is illustrated a modification of the specific embodiment of FIG. 5 showing how a thermo-sensitive element can be added to that configuration. Thus, the jacket 39 and the lining 40 are extended and bonded at 41. However, the jacket is now provided with a break or interruption in the form of an opening 42 through which is brought out and exposed a thermo-sensitive element 43. The connecting leads 44 for the thermo-sensitive element may be brought out between the jacket and core as shown or may be passed through an aperture in the core (not shown) near the bottom end of the assembly to the lining side thereof and brought out in the manner shown in FIG. 1. In order to seal the break or interruption 42 in the jacket and establish good thermal conductivity to the thermo-sensitive element, a ring element 45 of a chemically inert thermally conductive material such as tantalum is clamped or swaged over the jacket and thermo-sensitive element as shown in thermal transfer relationship thereto.

It should be apparent that the thermo-sensitive element and connecting leads will be installed and passed through the opening 42 prior to shrinkage into place of the jacket 39. It should also be evident that the technique just described for adding a thermo-sensitive element can be applied to the embodiments of FIGS. 3 and 4 and can be used to locate the thermo-sensitive element elsewhere along the operative length of the dip pipe assembly.

Under certain conditions it may be necessary to carry the jacket (see FIG. 1) up to the rear face of the flange 11 and provide it with a radially outward flare which, in use, is clamped to the flange. Since this would cover the vent holes 13 and 14 it will be necessary to replace them by boring through the flange 11, either radially or at an angle, and through the wall of the core 10 where it is joined to the flange. This modification has been illustrated in FIG. 7 wherein the same reference numerals have been used to designate the same or similar parts. The flared end of the jacket is shown at 46 while the angled bore or vent passage is shown at 47. It will be understood that the nozzle flange packing gland and gland flange of FIG. 1 may be omitted and the dip pipe flange 11 can be clamped directly between a conduit coupling and a vessel wall. In other respects the remainder of the dip pipe assembly of FIG. 7 may take any of the forms already described.

Having described the invention with reference to a number of specific embodiments thereof it will be clear to those skilled in the art that numerous changes may be made without departing from the spirit of the invention as defined in the appended claims.

What we claim is:

1. A dip pipe assembly comprising an elongated rigid tubular core, a connecting flange secured to one end of said core, a lining of extruded sintered P.T.F.E. resin extending throughout the length of the core in intimate contact with the walls thereof and beyond said one end of the core radially outwardly over the gasket face of said flange, a jacket of extruded sintered P.T.F.E. resin surrounding said core in intimate contact therewith from a point adjacent said flange to the opposite end of said core, a thermo-sensitive electrical element disposed adjacent said opposite end of the core between the latter and the lining, thermally conductive chemically inert means joined in thermal transfer relationship to said thermo-sensitive element and sealing the said opposite end of said core between said lining and jacket, a pair of electrical conductors connected to said thermo-sensitive element for making external electrical connection thereto, and means for mounting said assembly in the wall of a vessel.

2. A dip pipe assembly according to claim 1, wherein said thermo-sensitive element comprises a thermocouple.

3. A dip pipe assembly according to claim 1, wherein said thermally conductive chemically inert means comprises an annular cup-like member of tantalum having an inner tubular wall expanded within said lining and an outer tubular wall contracted about said jacket to compress the lined and jacketed core therebetween.

4. A dip pipe assembly comprising an elongated rigid tubular core, a connecting flange secured to one end of said core, a lining of extruded sintered P.T.F.E. resin extending throughout the length of the core in intimate contact with the walls thereof and beyond said one end of the core radially outwardly over the gasket face of said flange, a jacket of extruded sintered P.T.F.E. resin surrounding said core in intimate contact therewith from a point near to but spaced from said flange to the opposite end of said core, a thermo-sensitive electrical element disposed adjacent said opposite end of the core between the latter and the lining, thermally conductive chemically inert means joined in thermal transfer relationship to said thermo-sensitive element and sealing the said opposite end of said core between said lining and jacket, at least one aperture in the wall of said core located between said flange and the near end of said jacket, a pair of electrical conductors connected to said thermo-sensitive element and passing through said aperture for making external electrical connection to said element, and means for mounting said assembly in the wall of a vessel.

5. A dip pipe assembly comprising an elongated rigid tubular core, a connecting flange secured to one end of said core, a lining of extruded sintered P.T.F.E. resin extending throughout the length of the core in intimate contact with the walls thereof and beyond said one end of the core radially outwardly over the gasket face of said flange, a jacket of extruded sintered P.T.F.E. resin surrounding said core in intimate contact therewith from a point near to but spaced from said flange to the opposite end of said core, an electrical thermocouple disposed adjacent said opposite end of the core between the latter and the lining, thermally conductive chemically inert means joined in thermal transfer relationship to said thermocouple and sealing the said opposite end of said core between said lining and jacket, at least one aperture in the wall of said core located between said flange and the near end of said jacket, a pair of electrical conductors connected to said thermocouple and passing through said aperture for making external electrical connection to said thermocouple, means including a compression type gasket for securing a fluid-tight grip upon said assembly near the connecting flange but at a point overlying said jacket, said means being constructed for mounting said assembly in the wall of a vessel, and at least one further aperture in the wall of said core so located as to be in the region between said mounting means and the said opposite end of the core when the assembly is installed in a vessel.

6. A dip pipe assembly according to claim 5, wherein said thermally conductive chemically inert means comprises an annular cup-like member of tantalum having an inner tubular wall expanded within said lining and an outer tubular wall contracted about said jacket to compress the lined and jacketed core therebetween.

7. A dip pipe assembly according to claim 6, wherein the tip of said thermocouple is soldered to said cup-like member.

8. A dip pipe assembly comprising an elongated rigid tubular core, a connecting flange secured to one end of said core, a lining of extruded sintered P.T.F.E. resin extending throughout the length of the core in intimate contact with the walls thereof and beyond said one end of the core radially outwardly over the gasket face of said flange, a jacket of extruded sintered P.T.F.E. resin surrounding said core in intimate contact therewith from a point adjacent said flange to the opposite end of said core, said jacket and lining providing a chemically inert cover for said core, a thermo-sensitive electrical element disposed adjacent said opposite end of the core between the latter and the inert cover, thermally conductive chemically inert means joined in thermal transfer relationship to said thermo-sensitive element and sealing said inert cover about said opposite end of said core, a pair of electrical conductors connected to said thermo-sensitive element for making external electrical connection thereto, and means for mounting said assembly in the wall of a vessel.

9. A dip pipe assembly comprising an elongated rigid tubular core, a connecting flange secured to one end of said core, a lining of extruded sintered P.T.F.E. resin extending throughout the length of the core in intimate contact with the walls thereof and beyond said one end of the core radially outwardly over the gasket face of said flange, a jacket of extruded sintered P.T.F.E. resin surrounding said core in intimate contact therewith from a point adjacent said flange to the opposite end of said core, said jacket and lining providing a chemically inert cover for said core, a thermo-sensitive electrical element disposed between said core and the inert cover at a point remote from said flange, said cover having an interruption therein for exposing said element, thermally conductive chemically inert means joined in thermal transfer relationship to said thermo-sensitive element and sealing said interruption in said cover, a pair of electrical conductors connected to said thermo-sensitive element for making external electrical connection thereto, and means for mounting said assembly in the wall of a vessel with the thermo-sensitive element on the inside of the vessel.

10. A dip pipe assembly comprising an elongated rigid tubular core, a connecting flange secured to one end of said core, a lining of extruded sintered P.T.F.E. resin extending throughout the length of the core in intimate contact with the walls thereof and beyond said one end of the core radially outwardly over the gasket face of said flange, a jacket of extruded sintered P.T.F.E. resin surrounding said core in intimate contact therewith from a point adjacent said flange to the opposite end of said core, means joining said jacket and said lining at said opposite end of the core for providing a continuous chemically inert cover for said core, a thermo-sensitive electrical element disposed between said core and the inert cover at a point remote from said flange, said cover having a break therein for exposing said element, thermally conductive chemically inert means joined in thermal transfer relationship to said thermo-sensitive element and sealing said break in said cover, a pair of electrical conductors connected to said thermo-sensitive element for making external electrical connection thereto, and means for mounting said assembly in the wall of a vessel with the thermo-sensitive element on the inside of the vessel.

11. A dip pipe assembly comprising an elongated rigid tubular core, a connecting flange secured to one end of said core, a lining of extruded sintered P.T.F.E. resin extending throughout the length of the core in intimate contact with the walls thereof and beyond said one end of the core radially outwardly over the gasket face of said flange, a jacket of extruded sintered P.T.F.E. resin surrounding said core in intimate contact therewith from a point near to but spaced from said flange to the opposite end of said core, said jacket and lining providing a chemically inert cover for said core, a thermo-sensitive electrical element disposed between said core and the inert cover at a point remote from said flange, said cover having an interruption therein for exposing said element, thermally conductive chemically inert means joined in thermal transfer relationship to said thermo-sensitive element and sealing said interruption in said cover, at least one aperture in the wall of said core located between said flange and the near end of said jacket, a pair of electrical conductors connected to said thermo-sensitive element for making external electrical connection thereto, means including a compression type gasket for securing a fluid-tight grip upon said assembly near the connecting flange but at a point overlying said jacket, said means being constructed for mounting said assembly in the wall of a vessel with the thermo-sensitive element on the inside thereof, and at least one further aperture in the wall of said core so located as to be in the region between said mounting means and the said opposite end of the core when the assembly is installed in a vessel.

12. A dip pipe assembly in which an elongated rigid tubular core with a connecting flange secured to one end is covered with a lining and jacket of a chemically resistant material and arranged for mounting in a wall of a vessel such that a fluid-tight compression seal is developed between jacket and vessel, the lining extending beyond said one end of the core radially outwardly over the face of the flange and extending to the opposite end of said core where a seal is established between it and the jacket, characterized in that
 (a) the core consists of a unitary solid tube,
 (b) the lining and jacket consist of sintered tubes of extruded P.T.F.E. resin in tight engagement with the walls of the core but not bonded thereto,
 (c) the mounting arrangement presses the jacket against the core at the mounting point, and
 (d) an arrangement is provided including
  (i) at least one vent aperture which passes through the core wall for providing communication between the inner surface of said core and the external atmosphere beyond that end of said jacket which is nearest said flange, and
(ii) at least one further aperture which passes through the wall of the core located between the mounting point and the opposite end of the core and is covered by both the jacket and lining for venting the area between core and cover including the area under the jacket between the point where the jacket is sealed to the vessel when mounted and the said opposite end of the core.

References Cited in the file of this patent

UNITED STATES PATENTS

| | | |
|---|---|---|
| 1,615,503 | Brown | Jan. 25, 1927 |
| 2,027,961 | Currie | Jan. 14, 1936 |
| 2,451,704 | Wood | Oct. 19, 1948 |
| 2,485,492 | Hubbard et al. | Oct. 18, 1949 |
| 2,523,691 | Fitch | Sept. 26, 1950 |
| 2,753,893 | Brown | July 10, 1956 |
| 2,768,368 | Crane et al. | Oct. 23, 1956 |

FOREIGN PATENTS

| | | |
|---|---|---|
| 1881–235 | Great Britain | Jan. 20, 1881 |
| 964,183 | Germany | May 16, 1957 |